UNITED STATES PATENT OFFICE.

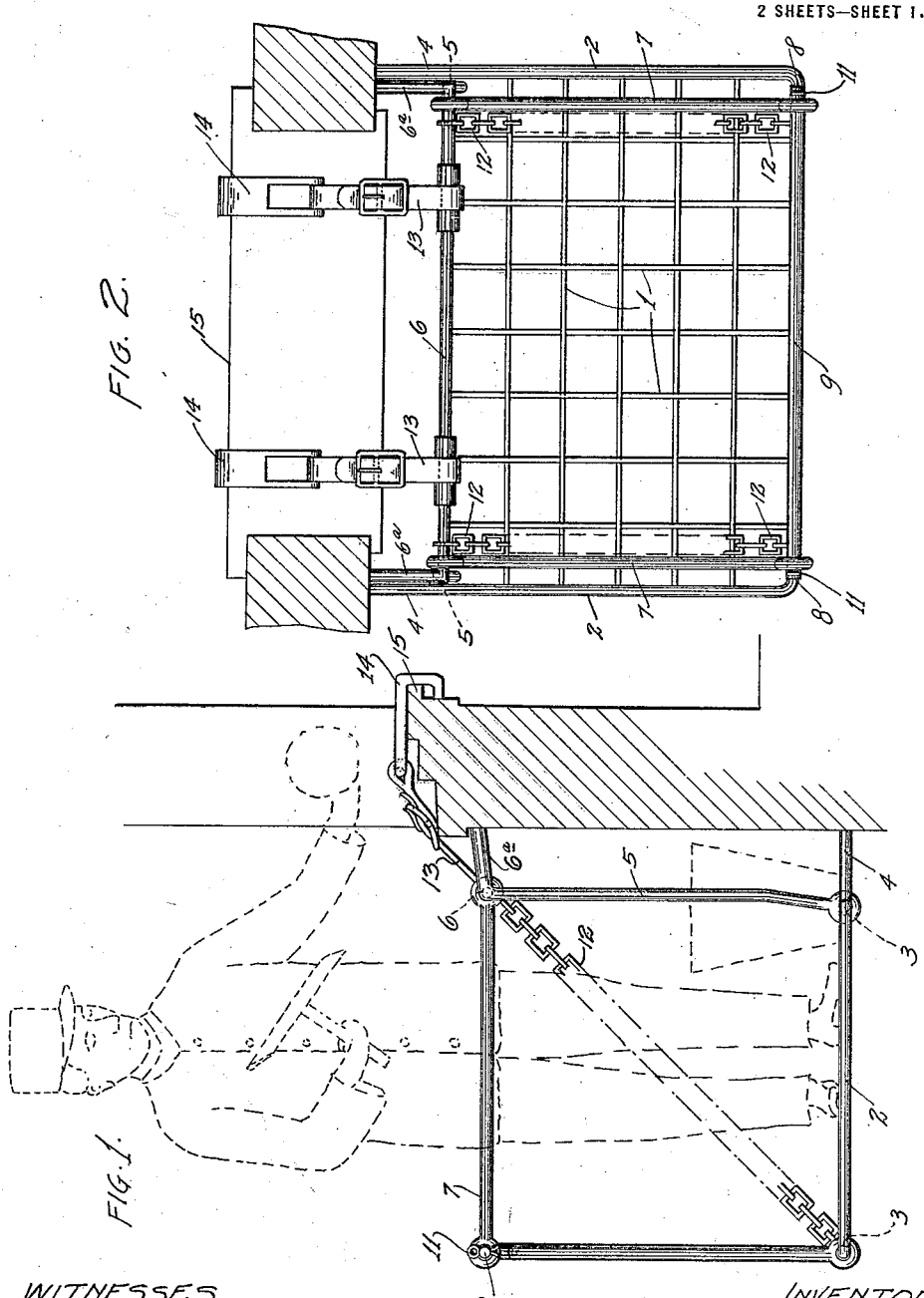

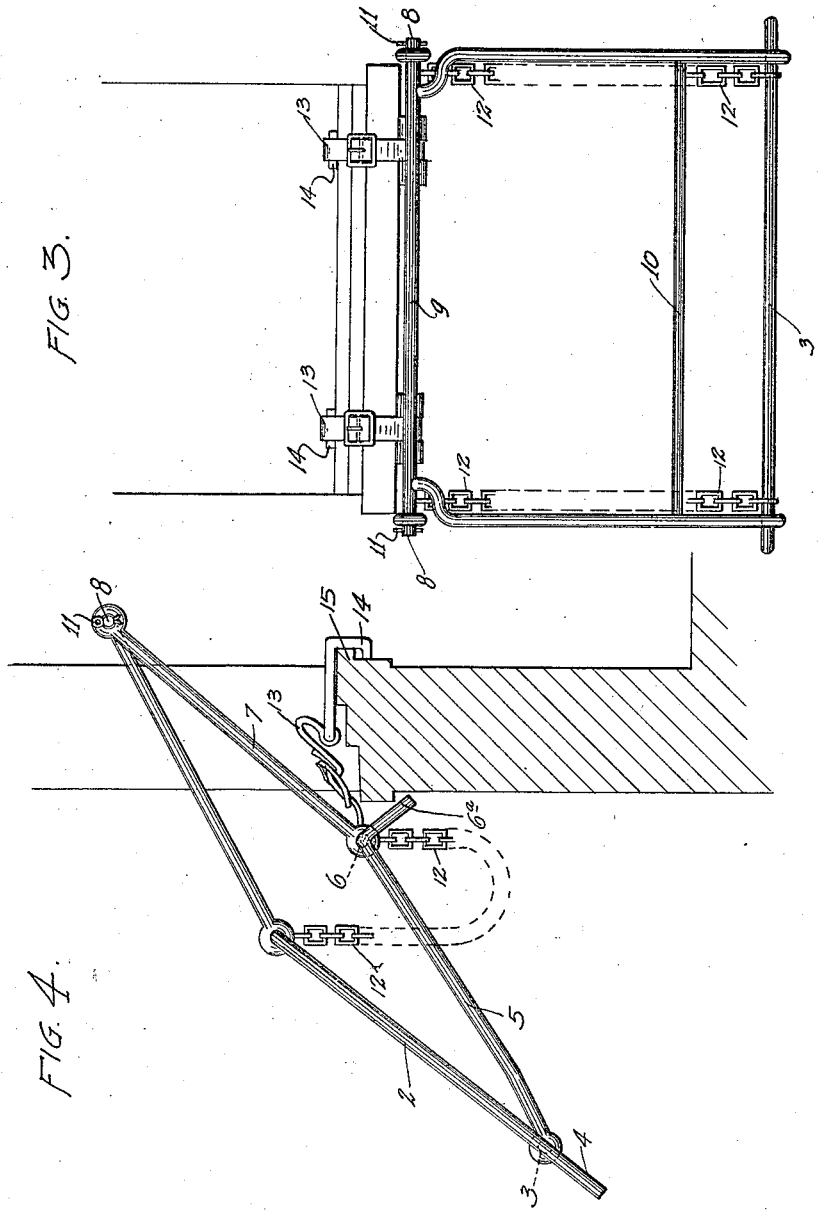

WALTER H. EDLAND, OF KENOSHA, WISCONSIN.

WINDOW-WASHER'S PLATFORM.

1,295,453. Specification of Letters Patent. Patented Feb. 25, 1919.

Application filed July 23, 1917. Serial No. 182,255.

*To all whom it may concern:*

Be it known that I, WALTER H. EDLAND, a citizen of the United States, residing at Kenosha, in the county of Kenosha and State of Wisconsin, have invented certain new and useful Improvements in Window-Washers' Platforms; of which the following is a specification.

This invention relates to improvements in window washers' platforms and its object is to provide a platform which is readily secured to the base of a window to support a person outside the window to permit him to wash or clean the window. A further object is to provide a platform of this type that is of simple construction, cheap to manufacture and that is readily secured to or removed from the window base. With the foregoing and other objects in view the invention consists in the combination and arrangement of parts to be hereinafter fully described, pointed out in the appended claims and illustrated in the accompanying drawings which form a part of this specification and in which—

Figure 1 is a side elevation of my improved platform illustrating its use and application.

Fig. 2 is a plan view of the platform illustrating its application.

Fig. 3 is a front view of the platform.

Fig. 4 is a side view of the platform partially collapsed to permit its attachment to or removal from the window base.

Like reference characters denote corresponding parts throughout the several views.

The reference numeral 1 denotes the base formed of cross bars supported by the lateral bars 2 and by the front and rear bars 3, said lateral bars being formed with projections 4 which extend beyond the rear bar 3 for engagement with the supporting element such as the side of a building or the like. To the rear bar 3 a rear frame composed of bars 5 and a cross bar 6 is pivotally secured, the free end 6ª of said bars being offset and adapted for engagement with the supporting element above the projections 4. Connecting bars 7 are pivotally carried by the cross bar 6 and are adapted for engagement with the free ends 8 of the top bar 9 of a front guard frame, which frame comprises also the side bars 9ª that are pivotally carried by the front bars 3 of the base, said guard frame being provided with a brace bar 10 transversely disposed. Cotter pins 11 serve to releasably secure the rods 7 to the free ends 8 of the top bar 9. Chains, or chains and straps 12 connect the cross bar 6 with the front bar 3 of the platform to retain the same in operative relation with the rear frame. Straps 13 also secured to the said cross bar 6 carry hooks 14 adapted to engage the base of the window as clearly shown in Figs. 1 and 4.

To place the platform in operative engagement with the base of a window the hooks 14 are first placed in engagement with the projecting inner portion 15 of the window sill. The device, partly collapsed as shown in Fig. 4, is then placed outside the window and its weight will cause the free ends 6ª of the bars 5 to engage with the window base, the projections 4 of the bars 2 engaging with the structure in which the windows are formed, the chains 12 will operate to retain the base 1 and bars 5 in operative relation, and the rods 7 will retain the front guard frame substantially at right angles to the base. The device is now ready for use by the operator who steps out through the window upon the base 1. To remove the device, the operator from inside the building reaches the front bar 3 of the base and pulls it toward him until the bars 5, 6ª assume substantially the position shown in Fig. 4 when the entire device may be drawn through the window and the hooks 14 removed from the window sill.

What is claimed is:—

1. In a window washer's platform, a rear frame, a base pivotally secured to said rear frame, a front guard frame pivotally secured to said base and disposed parallel to said rear frame, rods pivotally connecting said front guard frame and rear frame, flexible connection between the forward end of the base and the upper end of the rear frame, and flexible hook-carrying supports for the upper end of said rear frame.

2. In a window washer's platform, a rear frame formed with an offset portion for engagement with a supporting element, a base pivotally secured to said rear frame and formed with an extension projected beyond the point of engagement of said base with said rear frame, a front guard frame pivotally secured to said base and disposed parallel to said rear frame, bar-connection pivotally engaging said rear frame and front guard frame, flexible connection between the forward end of said base and the upper end of the rear frame, and flexible hook-carrying supports for the upper end of said rear frame.

In testimony that I claim the foregoing as my own I have hereto affixed my signature in the presence of two subscribing witnesses.

WALTER H. EDLAND.

Witnesses:
GRACE E. SHIELDS,
CHAS. H. PFENNIG.

Copies of this patent may be obtained for five cents each, by addressing the "Commissioner of Patents, Washington, D. C."